United States Patent
Cai et al.

(10) Patent No.: US 7,599,478 B2
(45) Date of Patent: Oct. 6, 2009

(54) IMS GATEWAY SYSTEMS AND METHODS FOR ONLINE CHARGING IN IMS NETWORKS

(75) Inventors: Yigang Cai, Naperville, IL (US); Xiang Yang Li, Biejing (CN); Peng Wang, Beijing (CN); Jay Z. Zhao, Beijing (CN)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1015 days.

(21) Appl. No.: 11/000,176

(22) Filed: Nov. 30, 2004

(65) Prior Publication Data

US 2006/0114932 A1    Jun. 1, 2006

(51) Int. Cl.
*H04M 15/00* (2006.01)
(52) U.S. Cl. .................. 379/114.21; 379/114.22; 379/114.23; 370/352; 370/466; 709/227
(58) Field of Classification Search .................. 379/114; 370/465, 336
See application file for complete search history.

(56) References Cited

U.S. PATENT DOCUMENTS 7,424,102 B2 *   9/2008   Koskinen et al. ........ 379/114.22

2006/0002422 A1 *   1/2006   Hurtta ........................ 370/465

FOREIGN PATENT DOCUMENTS

WO     WO-2004/036825 A1     4/2004

OTHER PUBLICATIONS

3rd Generation Partnership Project; Technical Specification Group Services and System Aspects; Telecommunication management;Charging management;Charging architecture and principles, (Release 6); 3GPP TS 32.240 V6.0.0 (Sep. 2004).
3rd Generation Partnership Project; Technical Specification Group Service and System Aspects; Telecommunication management; Charging management; Diameter charging applications, (Release 6); 3GPP TS 32.299 V6.0.0 (Sep. 2004).

(Continued)

*Primary Examiner*—Simon Sing
*Assistant Examiner*—Simon King

(57) ABSTRACT

Systems and methods are disclosed for providing online charging in an IMS network. An IMS gateway system receives a first message from a CSCF through a first interface for a call session, and processes the first message to determine whether to contact an OCS for online charging for the call session. If the determination is to contact the OCS, then the IMS gateway system generates a second message that comprises a charging request to transmit to the OCS. The IMS gateway system then maps fields of the first message in the first protocol to fields in the second message in a second protocol used by the OCS, and transmits the second message to the OCS through a second interface. The second message provides the OCS the proper information to perform online charging functions for the call session.

18 Claims, 11 Drawing Sheets

OTHER PUBLICATIONS

3$^{rd}$ Generation Partnership Project; Technical Specification Group Services and Systems Aspects; Telecommunication manqagement; Charging management; Charging principles (Release 5); 3GPP TS 32.200 v5.7.0 (Jun. 2004).

3$^{rd}$ Generation Partnership Project; Technical Specification Group Service and System Aspects; Telecommunication management; Online Charging System (CS): Applications and Interfaces (Release 6); 3GPP TS 32.296 v1.81.1 (Sep. 2004).

3$^{rd}$ Generation Partnership Project; Technical Specification Group Services and System Aspects; IP Multimedia Subsystem (IMS); Stage 2 (Release 6); 3GPP TS 23.228 v6.4.1 (Jan. 2004).

\* cited by examiner

IMS GATEWAY SYSTEMS AND METHODS FOR ONLINE CHARGING IN IMS NETWORKS

BACKGROUND OF THE INVENTION

1. Field of the Invention

The invention is related to the field of communications, and in particular, to IMS gateway systems and methods for providing online charging in IMS networks.

2. Statement of the Problem

As set forth in the $3^{rd}$ Generation Partnership Project (3GPP), an IP Multimedia Subsystem (IMS) provides a common core network having an access-agnostic network architecture for converged networks. Service providers are accepting this architecture in next generation network evolution. Providing efficient IMS online charging for operator revenue generation is important to the successful deployment of IMS networks.

Several 3GPP technical specifications describe online charging for IMS networks. For instance, the 3GPP TS 32.200 specification describes an online charging server (OCS) having a session charging function. The OCS is coupled to a call session control function (CSCF) through an IMS service control (ISC) interface. The CSCF controls a call session for a calling party or a called party and needs to communicate with the OCS over the ISC interface to provide online charging for the call session. However, an ISC interface is a service interface and does not support online charging. Therefore, in order to use the ISC interface between the CSCF and the OCS for online charging, additional functionality would unfortunately need to be added to the OCS.

In order to avoid overloading the OCS with additional functionality and to keep the online charging architecture consistent, the interface between the CSCF and the OCS may be changed to support online charging instead of adding functionality to the OCS. One option for an interface that supports online charging is to extend the ISC interface to allow for charging mechanisms. The ISC interface would then be both a service interface and a charging interface. Unfortunately, using the ISC interface as a hybrid service/charging interface may not be acceptable for standardization desired by the 3GPP.

Another option is to use the Ro interface instead of the ISC interface because the Ro interface already supports online charging. The 3GPP TS 32.296 specification suggests using the Ro interface for online charging by introducing an IMS gateway function that acts as a gateway between the CSCF and the OCS. The IMS gateway function as suggested in the 32.296 specification communicates with the CSCF over the ISC interface and communicates with the OCS over the Ro interface. Unfortunately, the 32.296 specification and the other 3GPP specifications do not describe how to use the IMS gateway function for online charging. For instance, the specifications do not define how the IMS gateway function is to operate to provide online charging. The specifications also do not resolve how the ISC interface, the Ro interface, and the CSCF would function together. For instance, the specifications state that whether the CSCF is directly connected to the OCS via a gateway (IMS gateway function) is beyond the scope of the standardization. The physical position of the IMS gateway function is in confusion in the specifications.

The current 3GPP specifications do not adequately define how online charging may be accomplished for IMS networks. A problem remains for defining the functionality to enable online charging for IMS networks.

SUMMARY OF THE SOLUTION

The invention solves the above and other related problems by defining systems and methods for providing online charging in an IMS network. The systems and methods described herein advantageously define a manner of providing online charging or online session charging that was previously not defined either in the 3GPP specifications or other publications. The systems and methods describe functionality between a call session control function (CSCF) handling a call session and an online charging server (OCS) having charging functionality, so that online charging may be accomplished for the call session. The systems and methods "trigger" on messages from the CSCF regarding the call session, and notify the OCS for online charging. Customers can then increase revenues by implementing the online charging functions.

One embodiment of the invention comprises an IMS gateway system that is coupled to a CSCF and an OCS to provide online charging. The IMS gateway system includes a first interface for communicating with the CSCF, a charging trigger system, and a second interface for communicating with the OCS. The first interface communicates with the CSCF according to a first protocol, where the first protocol does not support online charging. The second interface communicates with the OCS according to a second protocol that does support online charging.

In operation, the charging trigger system receives a first message from the CSCF for a call session through the first interface. The call session may be already established or may be initiated by the first message. The charging trigger system processes the first message to determine whether to contact the OCS for online charging for the call session. If the determination is not to contact the OCS, then the charging trigger system waits for the next message from the CSCF. If the determination is to contact the OCS, then the charging trigger system generates a second message that comprises a charging request to transmit to the OCS. The charging trigger system then maps fields of the first message in the first protocol to fields in the second message in the second protocol. The charging trigger system transmits the second message to the OCS through the second interface. The second message provides the OCS the proper information to perform online charging functions for the call session, such as validating the subscriber of the call session, determining a pre-paid balance for the subscriber, determining call session information and a rate for the call session, granting units for the call session, decrementing an amount of units from an account for the subscriber, or any other online charging functions.

Responsive to the OCS performing one or more charging functions, the charging trigger system receives a third message from the OCS responding to the second message. In the third message, the OCS may indicate whether the subscriber has a sufficient number of units to initiate or maintain a call session, whether to deny or terminate a call session, or any other information relating to online charging of the call session. The charging trigger system generates a fourth message indicating whether charging was allowed or denied for the call session and transmits the fourth message to the CSCF.

The IMS gateway system performs at least two advantageous functions. First, the IMS gateway system determines when to contact the OCS for online charging based on the messages received from the CSCF. Second, the IMS gateway system converts messages between the first protocol used by the CSCF to the second protocol used by the OCS. Therefore, the IMS gateway system can adequately provide online charging for call sessions handled by the CSCF.

The invention may include other exemplary embodiments described below.

DESCRIPTION OF THE DRAWINGS

The same reference number represents the same element on all drawings.

DETAILED DESCRIPTION OF THE INVENTION

FIGS. 1-12 and the following description depict specific exemplary embodiments of the invention to teach those skilled in the art how to make and use the best mode of the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
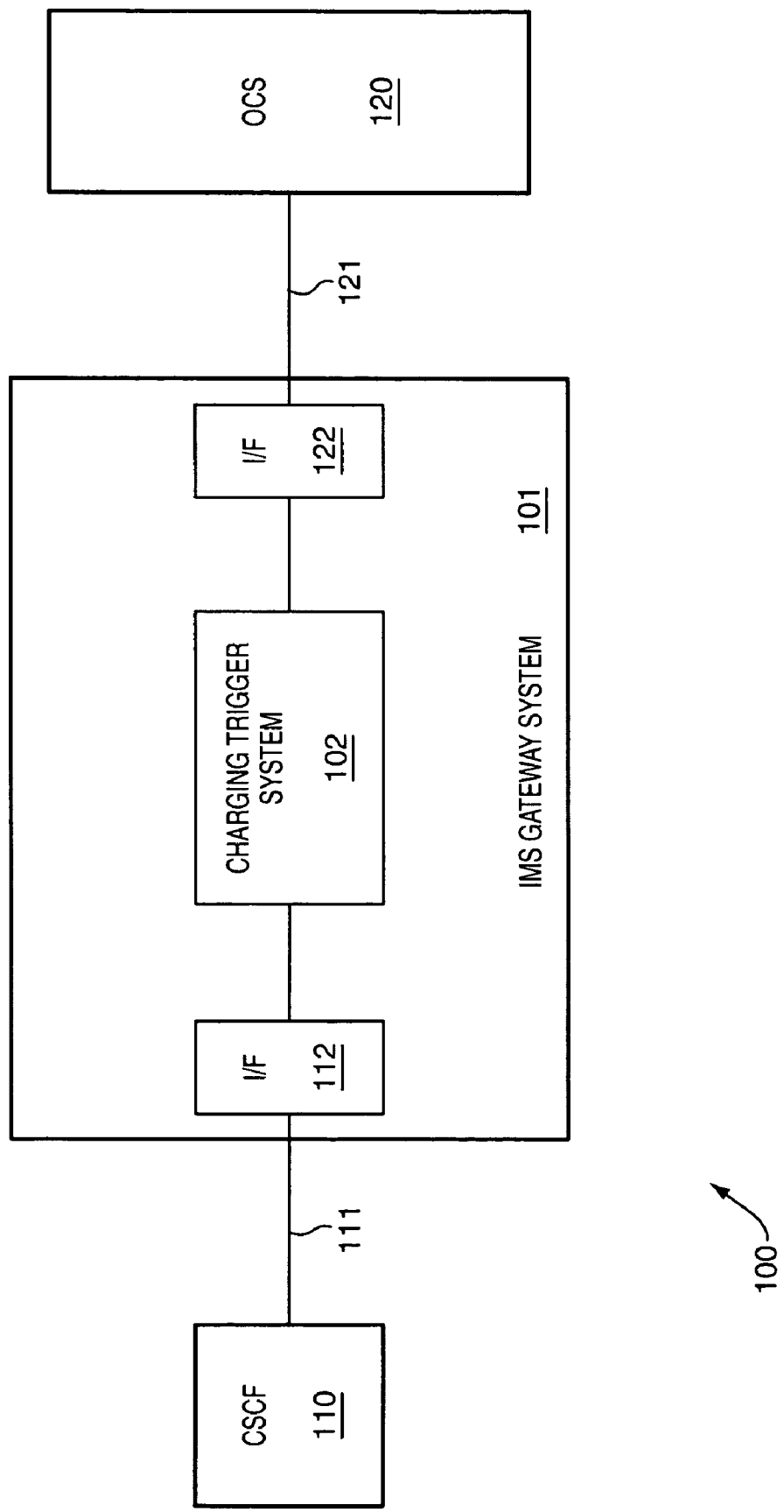
FIG. 1 illustrates an IP Multimedia Subsystem (IMS) network that provides online charging in an exemplary embodiment of the invention.

FIG. 1 illustrates an IP Multimedia Subsystem (IMS) network 100 that provides online charging in an exemplary embodiment of the invention. IMS network 100 includes a call session control function (CSCF) 110, an IMS gateway system 101, and an online charging server (OCS) 120. IMS gateway system 101 includes an interface 112 for communicating with CSCF 110, a charging trigger system 102, and an interface 122 for communicating with OCS 120. Interface 112 is coupled to CSCF 110 over a link 111 and communicates according to a first protocol. The first protocol does not support online charging. One example of the first protocol used by interface 112 and CSCF 110 is the IMS service control (ISC) protocol. Interface 122 is coupled to OCS 120 over a link 121 and communicates according to a second protocol different than the first protocol. The second protocol does support online charging. One example of the second protocol used by interface 122 and OCS 120 is the Ro protocol. IMS network 100 may include other components, devices, or systems not shown in FIG. 1.

IMS gateway system 101 and the following description defines how online charging may be accomplished in an IMS network 100. As a brief overview, IMS gateway system 101 in FIG. 1 is configured to receive messages from CSCF 110 regarding a call session. Based on these messages, IMS gateway system 101 determines whether to contact OCS 120 regarding online charging for the call session. If IMS gateway system 101 does contact OCS 120, then IMS gateway system 101 maps information in the messages in the first protocol from CSCF 110 to messages in the second protocol that are going to be transmitted to OCS 120. The operation of IMS gateway system 101 is more particularly described in the FIG. 2 and the following description.

Figure 2:
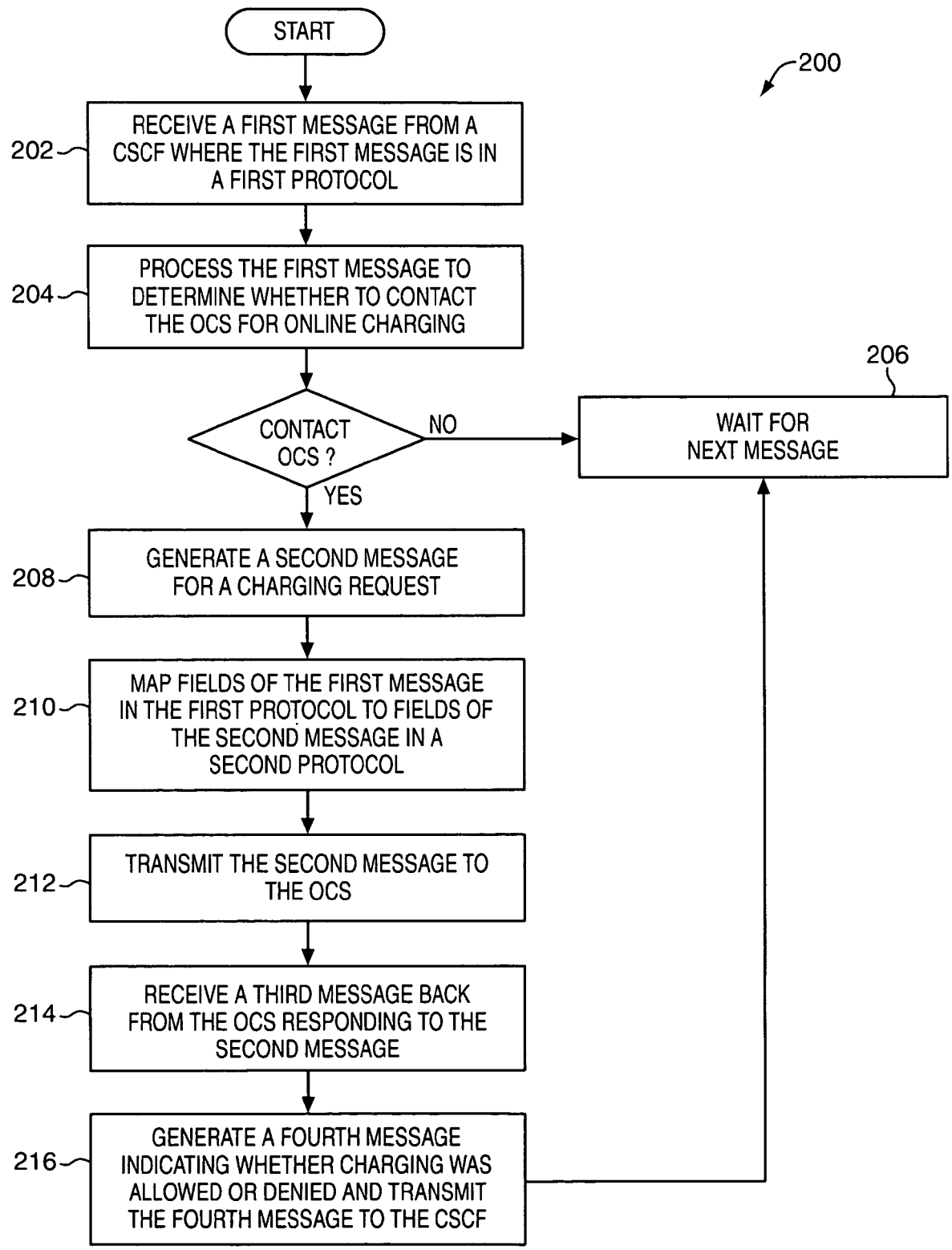
FIG. 2 is a flow chart illustrating a method of operating an IMS gateway system to provide online charging in an exemplary embodiment of the invention.

FIG. 2 is a flow chart illustrating a method 200 of operating IMS gateway system 101 to provide online charging in an exemplary embodiment of the invention. In step 202, charging trigger system 102 receives a first message from CSCF 110 for a call session through interface 112. The call session may be already established or may be initiated by the first message. The first message is in the first protocol. The first message may comprise a SIP message, such as a SIP INVITE message or a message of another protocol. In step 204, charging trigger system 102 processes the first message to determine whether to contact OCS 120 for online charging for the call session. For step 204, charging trigger system 102 may identify a rule, and process the first message based on the rule. For instance, a rule may include one or more conditions. If the conditions are satisfied for the first message, then charging trigger system 102 performs the actions defined in the rule. One of the actions may be to contact OCS 120 regarding charging for the call session. This rule-based approach allows for flexibility in defining under which conditions charging trigger system 102 contacts OCS 120 to report a charging record.

If the determination is not to contact OCS 120, then charging trigger system 102 waits for the next message from CSCF 110 in step 206. If the determination is to contact OCS 120, then charging trigger system 102 generates a second message that comprises a charging request to transmit to OCS 120 in step 208. One example of the second message is a Credit Control Request (CCR). In step 210, charging trigger system 102 maps fields of the first message in the first protocol to fields in the second message in the second protocol. In step 212, charging trigger system 102 transmits the second message to OCS 120 through interface 122. The second message provides OCS 120 the proper information to perform online charging functions for the call session, such as validating the subscriber of the call session, determining a pre-paid balance for the subscriber, determining call session information and a rate for the call session, granting units for the call session, decrementing an amount of units from an account for the subscriber, or any other online charging functions.

Responsive to OCS 120 performing one or more charging functions, charging trigger system 102 receives a third message from OCS 120 responding to the second message in step 214. In the third message, OCS 120 may indicate whether the subscriber has a sufficient number of units to initiate or maintain a call session, whether to allow or deny charging for a call session, or any other information relating to online charging of the call session. In step 216, charging trigger system 102 generates a fourth message indicating whether charging was allowed or denied for the call session from OCS 120 and transmits the fourth message to CSCF 110 through interface 112. For instance, if the subscriber has sufficient units in a prepaid account in OCS 120, then the fourth message indicates that charging is allowed for the call session and CSCF 110 may continue with the call session.

IMS gateway system 101 in FIG. 1 may also include functionality to monitor a budget or number of units for call sessions, instead of completely relying on OCS 120 to monitor an account for the subscriber.

Figure 3:
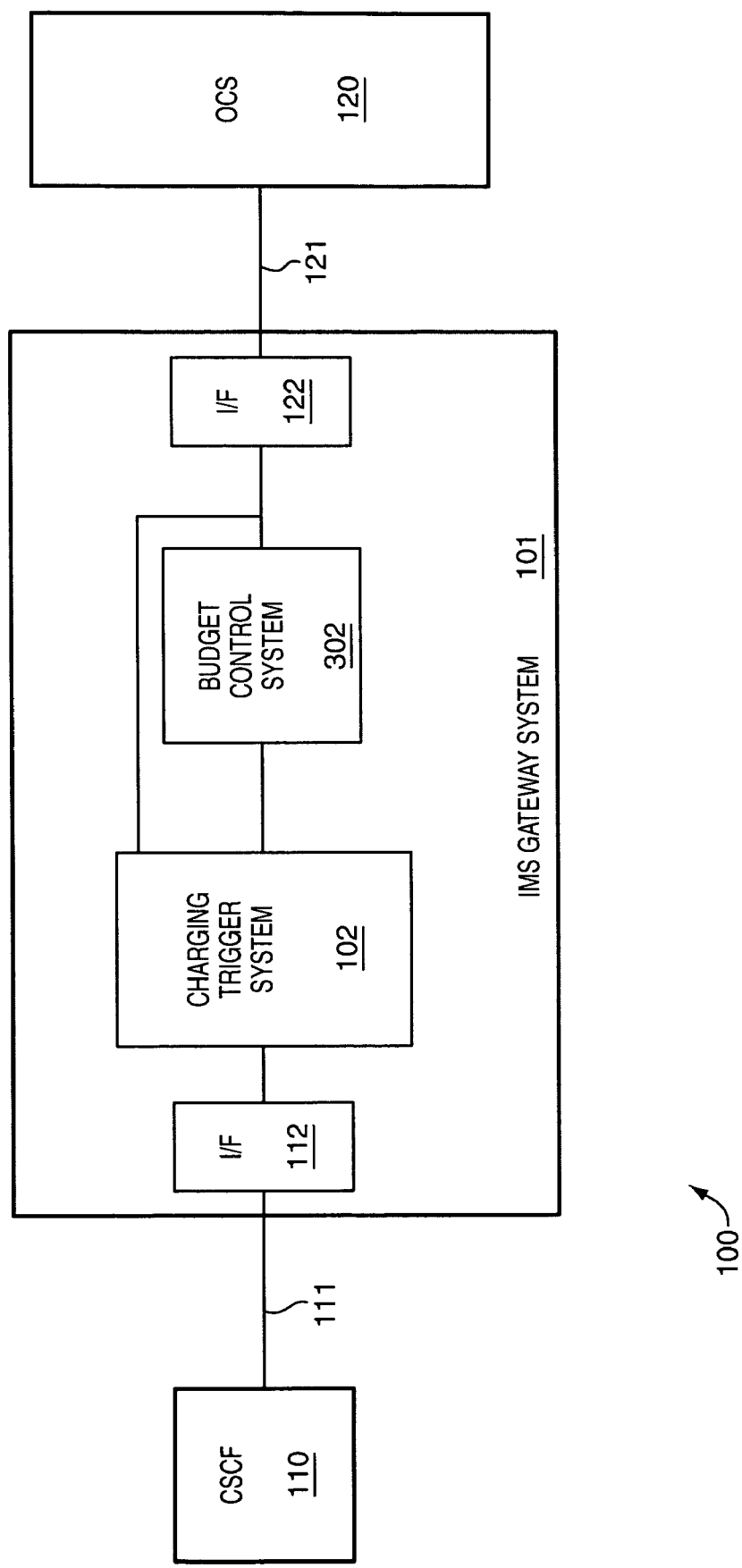
FIG. 3 illustrates an IMS network where an IMS gateway system further includes a budget control system in another exemplary embodiment of the invention.

FIG. 3 illustrates IMS network 100 where IMS gateway system 101 further includes a budget control system 302 in another exemplary embodiment of the invention. Budget control system 302 is coupled to charging trigger system 102 and interface 122. Charging trigger system 102 operates as described above and as shown in FIG. 2. Budget control system 302 operates as follows.

Figure 4:
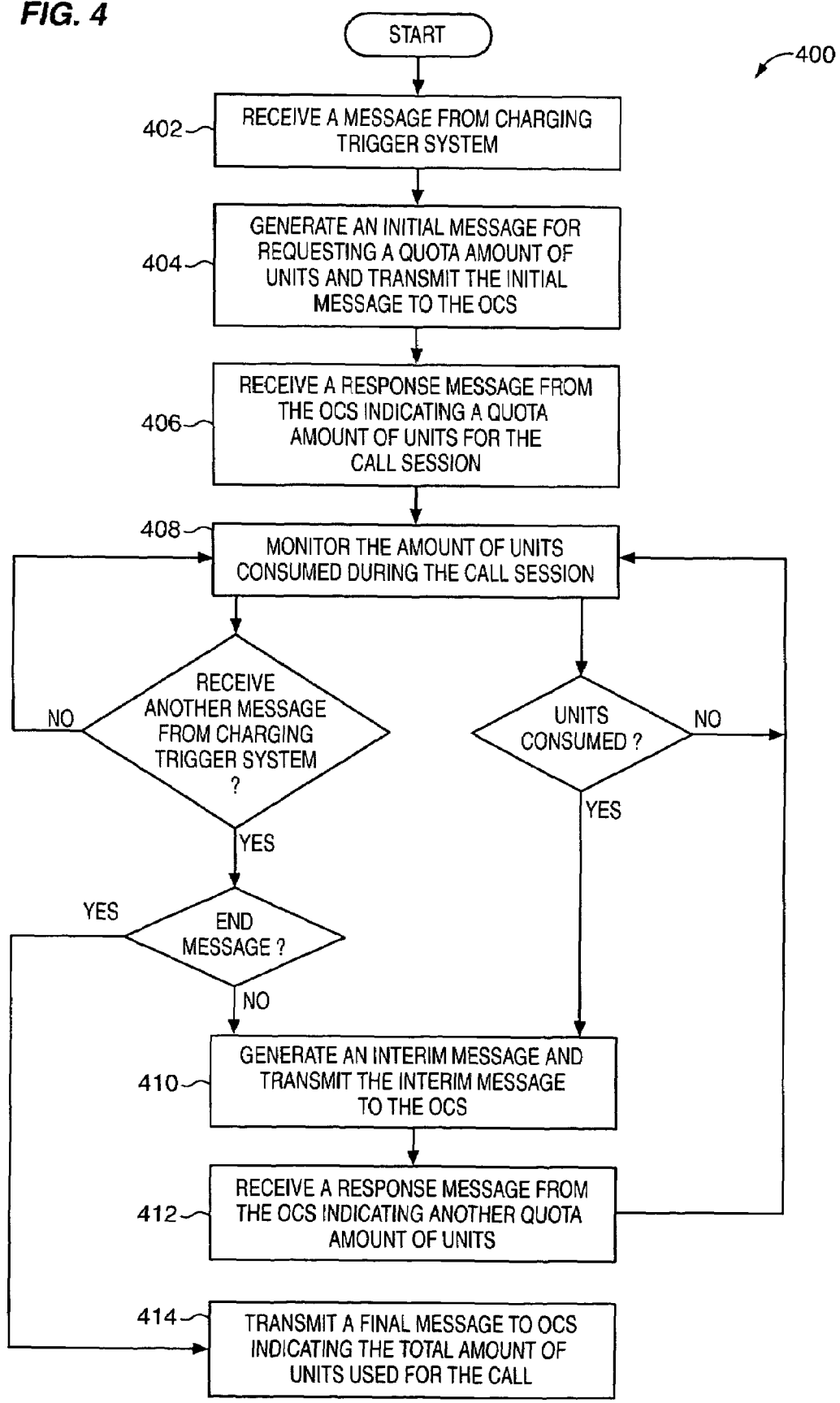
FIG. 4 is a flow chart illustrating a method of operating a budget control system in an exemplary embodiment of the invention.

FIG. 4 is a flow chart illustrating a method 400 of operating budget control system 302 in an exemplary embodiment of the invention. In step 402, budget control system 302 receives a message from charging trigger system 102 indicating that charging trigger system 102 is transmitting a message to OCS 120 for a charging request. Responsive to receiving the message from charging trigger system 102, budget control system 302 generates an initial message in step 404, and transmits the initial message to OCS 120 through interface 122. The initial message requests a quota amount of units from OCS 120. The initial message also provides OCS 120 the proper information to identify the subscriber, identify an account for the subscriber and determine a balance in the account, and determine a quota amount of units to allocate to budget control system 302. The term "units" is being used to describe a balance for a subscriber, and "units" may refer to any unit of measure, such as minutes or currency. The initial message may comprise a CCR message.

In step 406, budget control system 302 receives a response message from OCS 120 indicating a quota amount of units for the call session allocated to budget control system 302. The quota amount of units comprises any amount allowed or provided by OCS 120. The quota amount of units does not necessarily indicate the total balance of the account of the subscriber. The response message may comprise a CCA message. In step 408, budget control system 302 monitors the amount of units consumed during the call session.

If the quota amount of units is consumed during the call session or another message is received from charging trigger system 102, then budget control system 302 generates an interim message and transmits the interim message to OCS 120 through interface 122 in step 410. The interim message indicates the number of units consumed. The interim message also requests a new quota of units from OCS 120. In step 412, budget control system 302 receives a response message from OCS 120 indicating another quota amount of units for the call session allocated to budget control system 302. Budget control system 302 then monitors the amount of units consumed during the call session as provided in step 408.

If budget control system 302 receives a message from charging trigger system 102 indicating that the call session is ending or has ended, then budget control system 302 generates a final message in step 414, and transmits the final message to OCS 120 through interface 122. The final message reports the total amount of units used for the call session.

Figure 5:
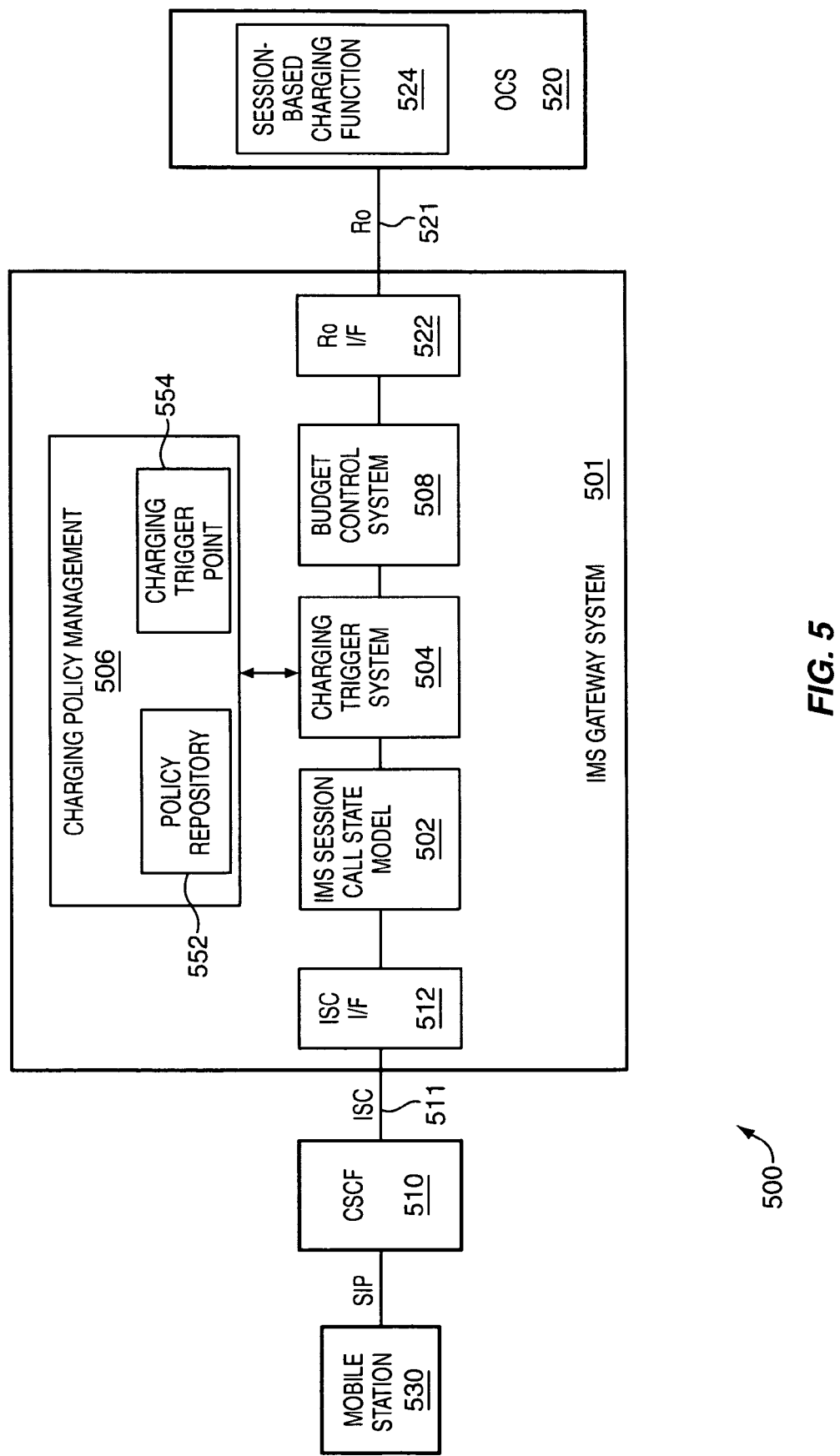
FIG. 5 illustrates a standalone IMS gateway system in another exemplary embodiment of the invention.

FIG. 5 illustrates an IMS network 500 with a standalone IMS gateway system 501 in another exemplary embodiment of the invention. IMS network 500 includes a mobile station 530, a call session control function (CSCF) 510, an IMS gateway system 501, and an online charging server (OCS) 520. IMS gateway system 501 is shown as being a separate node from CSCF 510 and OCS 520. IMS gateway system 501 includes an ISC interface 512 for communicating with CSCF 510, an IMS session call state model 502, a charging trigger system 504, a charging policy management unit 506, a budget control system 508, and an Ro interface 522 for communicating with OCS 520. ISC interface 512 is coupled to CSCF 510 over a link 511 and communicates according to an ISC protocol. For instance, ISC interface 512 may comprise a SIP interface or other similar protocol. Ro interface 522 is coupled to OCS 520 over a link 521 and communicates according to an Ro protocol. More particularly, Ro interface 522 is connected to a session-based charging function 524 in OCS 520 by link 521. IMS network 500 may include other components, devices, or systems not shown in FIG. 5.

Figure 6:
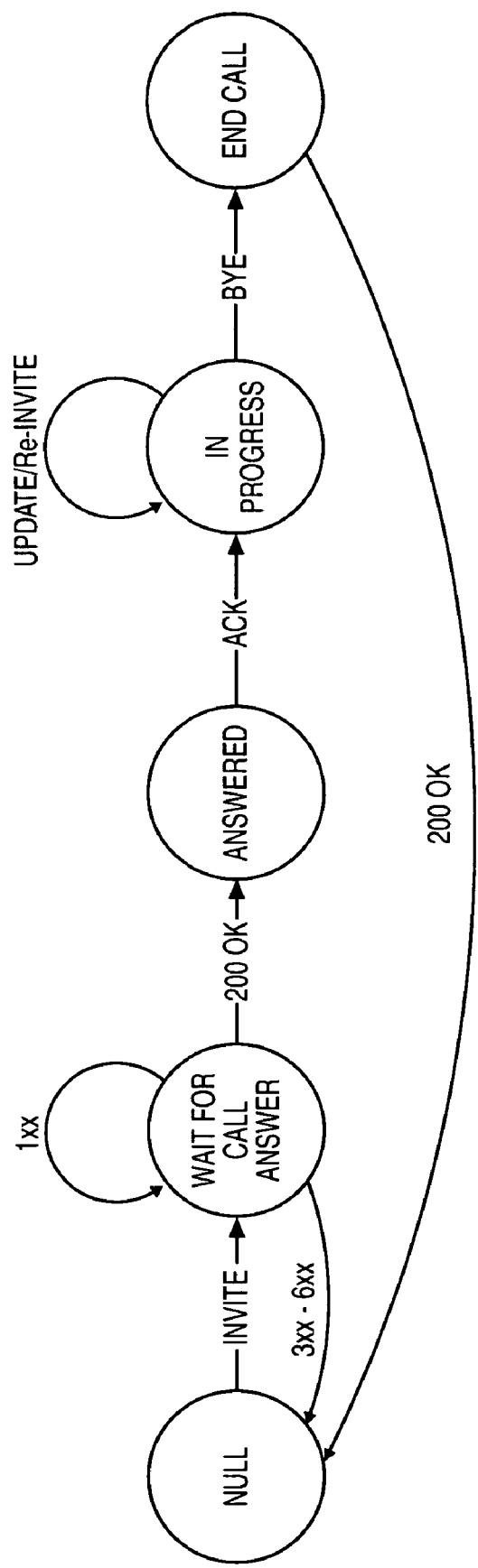
FIG. 6 is a state diagram illustrating a call state model in an exemplary embodiment of the invention.

In this embodiment, IMS gateway system 501 acts as a state-based SIP Proxy for IMS session control due to call state model 502. There are five states defined for call state model 502 for a call session, (1) Null; (2) Wait For Cal/Answer; (3) Answered; (4) In Progress; and (5) End Call. FIG. 6 is a state diagram illustrating the call state model 502. Prior to a subscriber placing a call received by IMS gateway system 501 through CSCF 510, IMS gateway system 501 works in the Null state. If a SIP INVITE message is received, then IMS gateway system 501 performs a session credit authorization from OCS 520. If the INVITE message is successfully handled and sent out to mobile station 530 through CSCF 510, then the session state is changed to Wait For Call Answer. If a 200 OK message is received, IMS gateway system 501 executes a credit re-authorization from OCS 520 and changes the session state to Answer. If an ACK is received, IMS gateway system 501 confirms that the call session has been successfully established and changes the session state to In Progress. While the call session is going on, if any UPDATE/Re-INVITE messages are received to update the current call session, the session state is kept in the In Progress state. If a BYE message is received, IMS gateway system 501 ends the current call session processing, and changes the session state to End Call. IMS gateway system 501 then submits session charging record information to OCS 520, changes the session state to Null, and waits for the next new call session.

If any provisional 1xx message is received from the network when IMS gateway system 501 is in the Wait For Call Answer state, then IMS gateway system 501 refreshes the current session and continues to wait for the call answer. If any redirection message (3xx), client error message (4xx), server error message (5xx), or global error message (6xx) is received, then IMS gateway system 501 ends the current call session and returns to the Null state.

In each IMS state, IMS gateway system 501 works with charging trigger system 504 to provide subscriber online charging. In this embodiment, charging trigger points are defined as a group of rules to match SIP/SDP (Session Initiation Protocol/Session Description Protocol) messages: SIP method rule, Request-URI rule, SIP header rule, Session Case rule, Session Description rule. The charging trigger point enables the following information to be reported to OCS 520 by IMS gateway system 501: (1) basic IMS call information; (2) media component update within an IMS session; (3) QoS update within an IMS session; and (4) mobile location update within an IMS session. Triggering based on the group of rules provides flexibility to the operator or vendor to specify at which points to report charging records to OCS 520 without modification to the SIP session handling logic or budget control system 508.

The policy rules are stored in a policy repository 552. In the charging policy management unit 506, a rule is expressed as a condition list and a sequence of actions. For instance, a rule may be expressed as:

```
    IF  Condition_List
    THEN
          Sequence_Actions
    END IF
```

The condition list is constructed with a list of conditions linked by a Boolean operator AND, OR, and NOT in CNF (Conjunctive Normal Form). When a rule is invoked, the rule condition is evaluated. If the rule conditions are matched, then the actions under the rule will be executed in the order.

In this embodiment, the charging trigger points 554 are defined in three kinds of monitor type: INTERRUPT type, NOTIFY type, or NULL type (trigger is not armed). If a trigger point is configured as INTERRUPT type and the trigger criteria is matched, then IMS gateway system 501 suspends IMS session processing and waits for instructions from OCS 520. If a trigger point is configured as NOTIFY type and the trigger criteria is matched, then IMS gateway system 501 transmits session information to OCS 520 and continues with the session processing. If the charging trigger is not armed in IMS gateway system 501, then IMS gateway system 501 returns the SIP message to CSCF 510 to continue the current session without any charging control relationship. The following lists examples of triggers:

```
    IF   SIP_Method = "INVITE" AND Call_Status = "NULL"
    AND Trigger_Point_Type = "INTERRUPT"
    THEN
         Hold on the current session
         Send "CCR [INITIAL]" charging report to OCS
         Start timer to wait for "CCA [INITIAL]" from OCS
    END IF
    IF   SIP_Method = "200" AND
         Call_Status = "WAIT_FOR_CALL_ANSWER"
    AND Trigger_Point_Type = "NOTIFY"
    THEN
         Continue the current session.
         Send "CCR [UPDATE]" charging report to OCS
         Start timer to wait for "CCA [UPDATE]" from OCS
    END IF
    IF   SIP_Method = "ACK" AND Call_Status = "ANSWERED"
    AND Trigger_Point_Type = "NULL"
    THEN
         Continue the current session
    END IF
```

IMS gateway system 501 supports the session budget control in budget control system 508 to supervise a granted quota of units from OCS 520. Budget control system 508 communicates with OCS 520 via Ro interface 522, which is an extension of the Credit-Control-Request (CCR) and Credit-Control-Answer (CCA) defined in the draft IETF Diameter Credit Control Application protocol. Budget control system 508 is based on a series of "interrogations" between IMS gateway system 501 and OCS 520 via Ro interface 522. The interrogations comprise an initial interrogation, one or more interim interrogations, and a final interrogation. Each interrogation is composed of a CCR-CCA pair.

Figure 7:
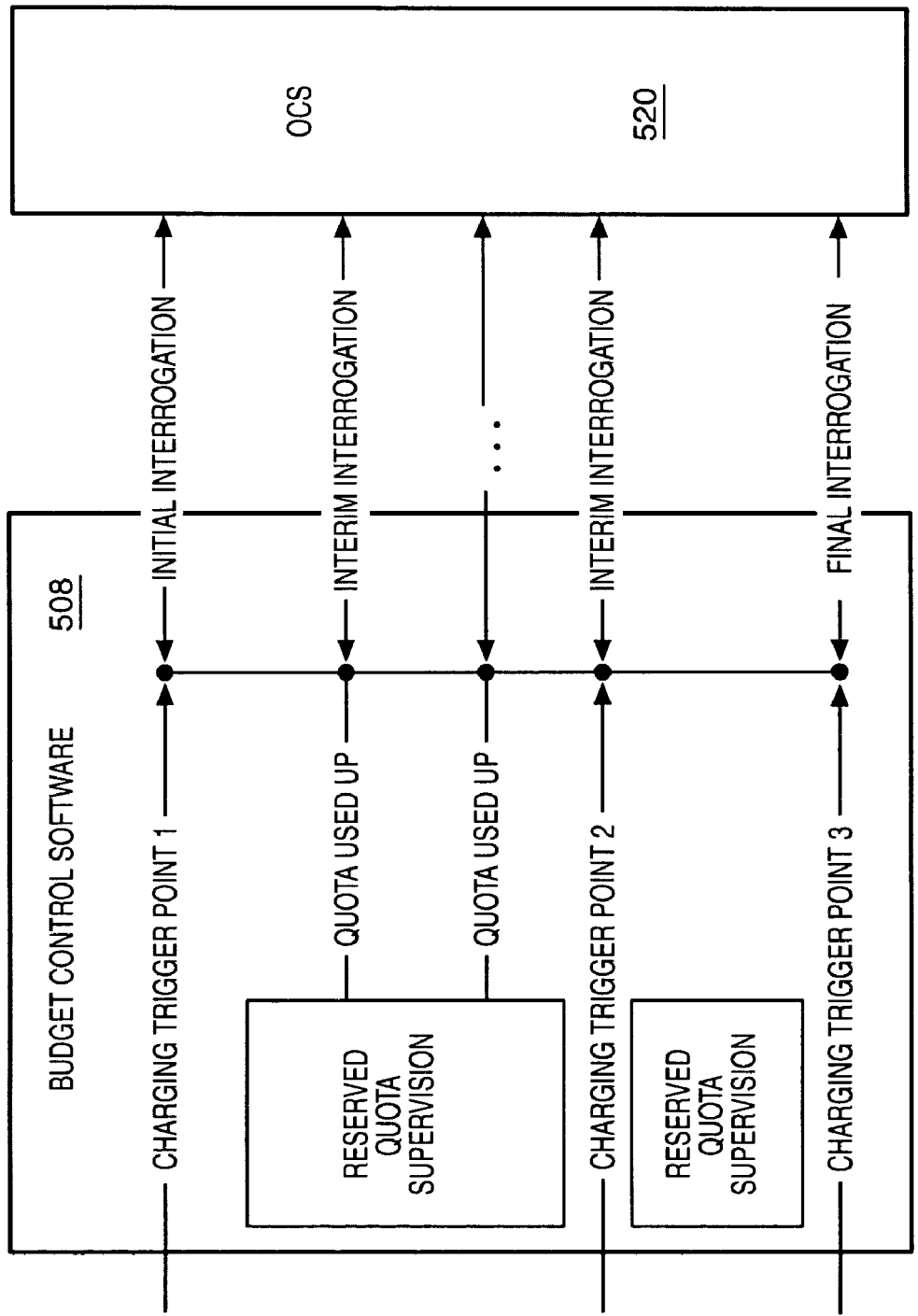
FIG. 7 illustrates messaging used in an IMS gateway system in supporting session budget control in an exemplary embodiment of the invention.

FIG. 7 illustrates the messaging used in IMS gateway system 501 in supporting the session budget control. In the initial interrogation (i.e. CCR [INITIAL] and CCA [INITIAL]), budget control system 508 transmits an initial message (i.e. CCR [INITIAL]) to OCS 520 to request a quota amount of units from OCS 520. Budget control system 508 receives a response message (i.e. CCA [INITIAL]) from OCS 520 indicating a reserved quota of units. When the reserved quota is consumed to a defined threshold, or the next charging point is triggered, budget control system 508 transmits an interim message to OCS 520 as an interim interrogation (i.e. CCR [UPDATE] and CCA [UPDATE]) to report the actual number of quota units used until the current charging point. Budget control system 508 also requests a new quota of units for the next charging point. In a final interrogation (i.e. CCR [TERMINATION] and CCA [TERMINATION]), budget control system 508 reports the total used units consumed in the IMS call session.

Figure 8:
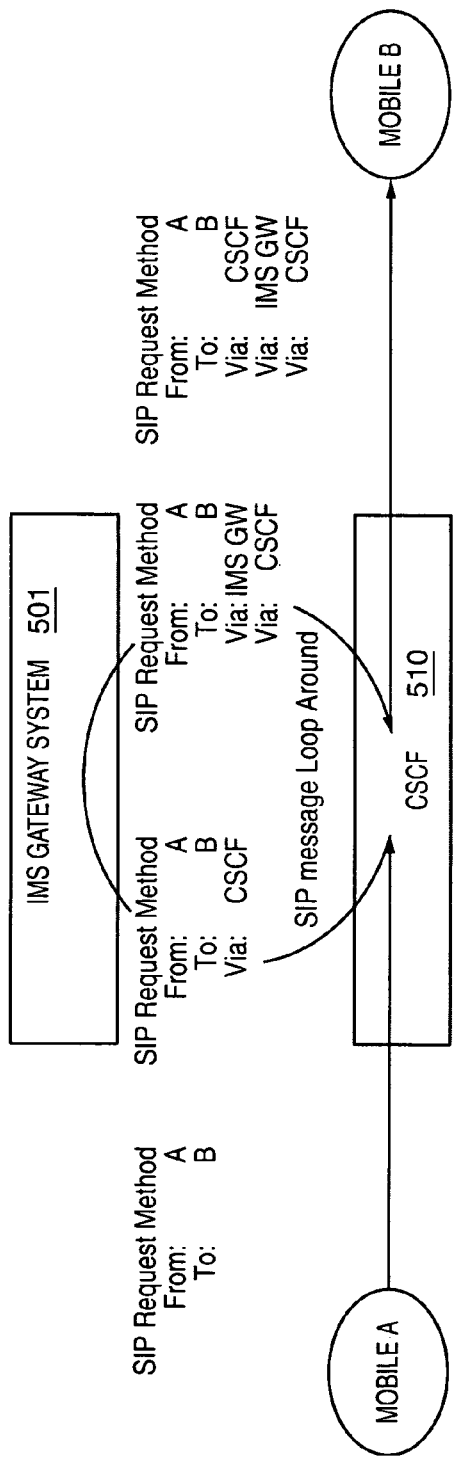
FIGS. 8-9 illustrate a loop around mechanism used to implement SIP message routing in an exemplary embodiment of the invention.
Figure 9:
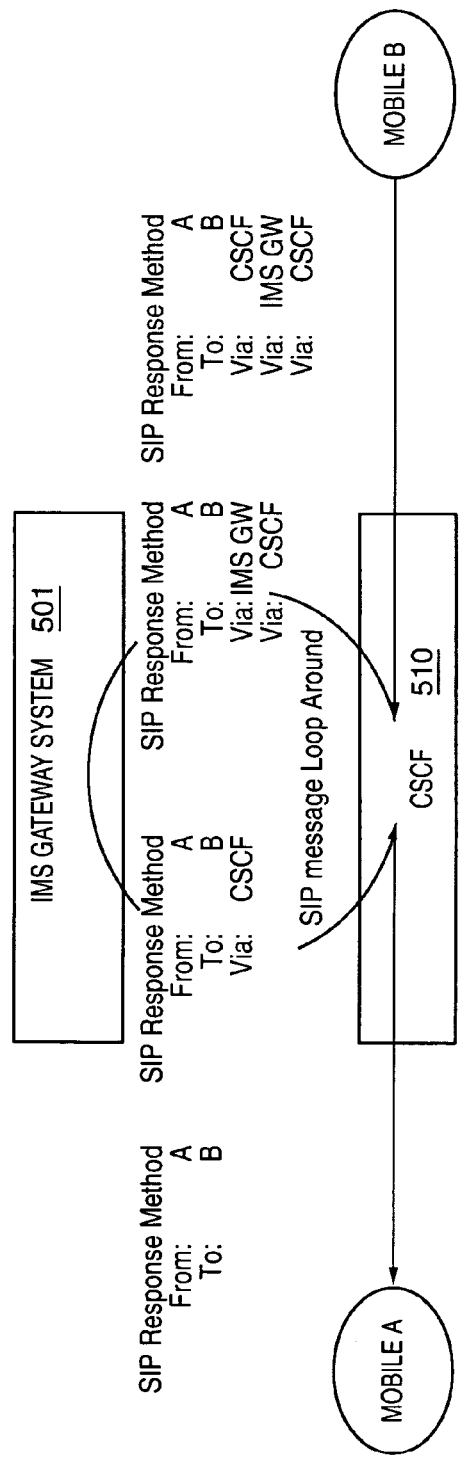

FIGS. 8-9 illustrate a loop around mechanism used to implement SIP message routing between CSCF 510 and IMS gateway system 501. The loop around mechanism enables IMS gateway system 501 to execute the session charging control without breaking the normal session control in CSCF 510.

When CSCF 510 receives a SIP message, CSCF 510 routes the SIP message to IMS gateway system 501 for session control. After the session charging control, IMS gateway system 501 routes the same SIP message back to CSCF 510. Thus, a message interaction between CSCF 510 and IMS gateway system 501 will be a loop.

To perform the loop back function, when a SIP request message is routed from mobile station A to CSCF 510, CSCF 510 adds its address to the Via field in the SIP request message (see FIG. 8). In other embodiments, other fields of the SIP request message may be used. CSCF 510 then routes the SIP request message to IMS gateway system 501. After session charging control handling, IMS gateway system 501 adds its address to the Via field, which is above the Via field of the address of CSCF 510. IMS gateway system 501 then routes the SIP request message back to CSCF 510 for further control processing. When CSCF 510 routes the SIP request message, CSCF 510 adds its address again to the Via field above the address of IMS gateway system 501. When the SIP message is routed to mobile station B, there will be at least three Via fields in the header of this SIP message. Therefore, there will be a Via field loop: CSCF→IMS gateway system→CSCF.

When the SIP response message is routed back from mobile station B to CSCF 510, CSCF 510 performs any required functions and strips off the top address in the Via field, which is the first instance of the address of CSCF 510 (see FIG. 9). CSCF 510 then routes the SIP response message to the next address in the Via field, which is the address for IMS gateway system 501. IMS gateway system 501 performs any required functions and strips off the top address in the Via field, which is its address. IMS gateway system 501 then routes the SIP response message to CSCF 510. CSCF 510 performs any required functions and strips off the remaining address in the Via field, which is the second instance of the address of CSCF 510. CSCF 510 then routes the SIP response message to mobile station A.

IMS gateway system 501 provides the following advantages. The gateway functionality of standalone IMS gateway system 501 is clearly separated from CSCF 510 and OCS 520. IMS gateway system 501 does not burden the session control of CSCF 510 which is the main function of CSCF 510. IMS gateway system 501 also does not overload OCS 520 with network call control. The standalone IMS gateway system 501 can also inter-operate with different vendor's OCS 520 or CSCF 510. This gives IMS gateway system 501 a more flexible extension without great impact to OCS 520 and CSCF 510 components.

IMS gateway system 501 provides many advantages in providing a useful online charging function. IMS gateway system 501 uses policy-based charging trigger system 504 that enables real-time reporting of IMS session information for IMS online charging. IMS gateway system 501 has a budget control system 508 to enable real-time supervision of IMS session credit consuming. IMS gateway system 501 also creates an extension to the existing ISC interface and Diameter Ro interface for session-based online charging. IMS gateway system 501 also includes a protocol translation engine to map SIP messages to Ro messages.

The following gives three examples of the operation of IMS network 500 in an originating IMS call scenario, a terminating call scenario, and a session termination after credit has been exhausted.

EXAMPLE #1

Figure 10:
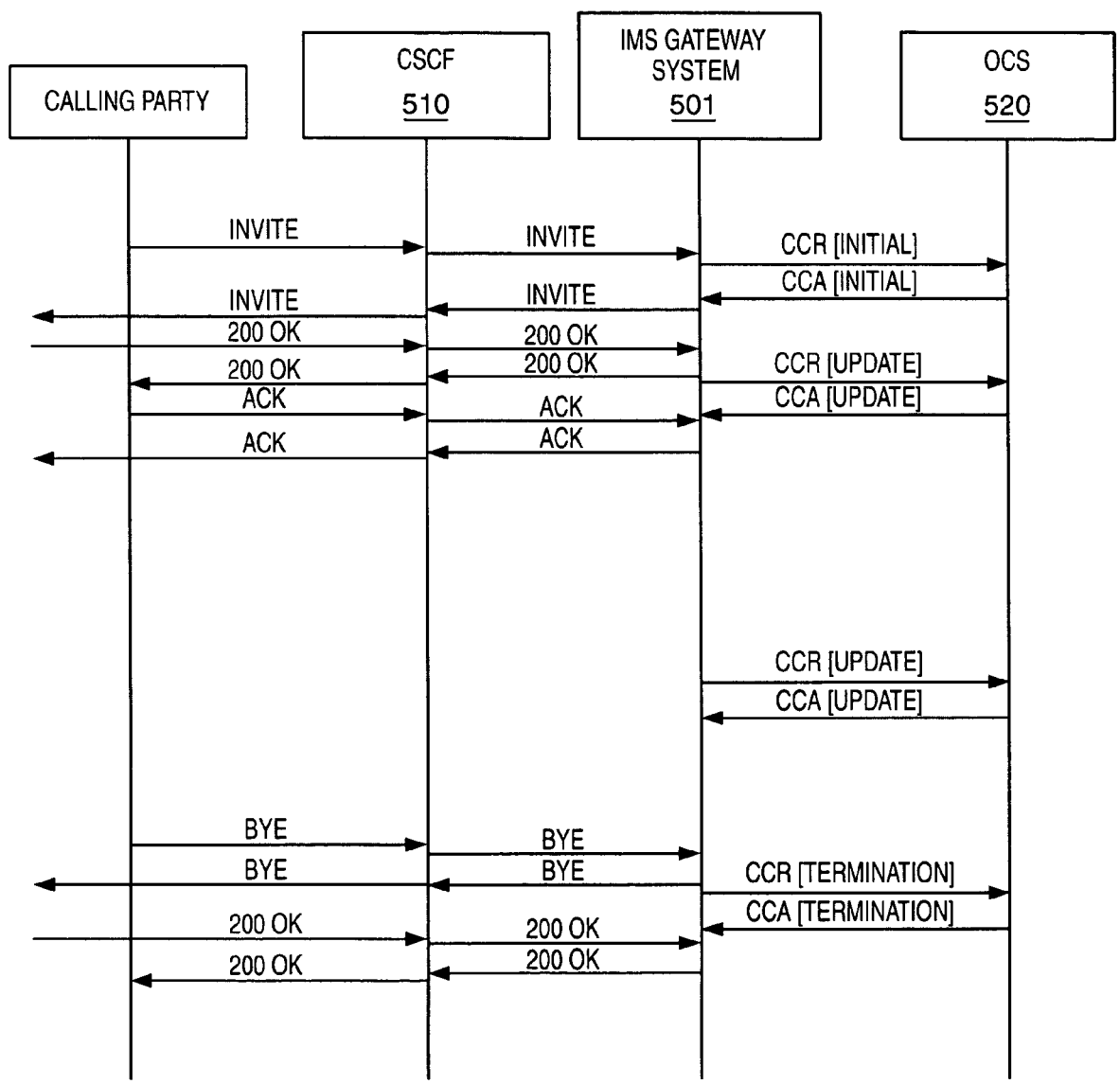
FIG. 10 is a message diagram illustrating an originating IMS call scenario for an IMS network in an exemplary embodiment of the invention.

FIG. 10 illustrates an originating IMS call scenario for IMS network 500 described in FIG. 5. To start, a calling party (or calling party station) transmits a SIP INVITE message to CSCF 510. CSCF 510 transmits the INVITE message to IMS gateway system 501. IMS gateway system 501 evaluates that this is the first INVITE message of this session, and the current call status is set to Null. IMS gateway system 501 invokes a charging Policy Enforcement Point (PEP) to request a charging Policy Decision Point (PDP) for charging trigger processing. In the policy management, the charging trigger point is configured as an INTERRUPT. IMS gateway system 501 starts a timer to hold on the current session. The charging trigger rule in the PDP can be expressed as the following:

```
IF   SIP_Method = "INVITE" AND Call_Status = "NULL"
AND Trigger_Point_Type = "INTERRUPT"
THEN
    Hold on the current session
    Send "CCR [INITIAL]" charging report to OCS
    Start timer to wait for the "CCA [INITIAL]" from OCS
END IF
```

IMS gateway system 501 transmits a Diameter Credit Control Request (CCR) [INITIAL] message to OCS 520 for credit authorization to roughly estimate the maximum session duration the calling party can use. OCS 520 grants quota units and sets the granted quota to the relevant granted Quota AVP in a Diameter Credit Control Answer (CCA) message. OCS 520 populates the extended session charging trigger AVP in the CCA message. OCS 520 then transmits the CCA [INITIAL] message to IMS gateway system 501. When IMS gateway system 501 receives the CCA message and determines whether the session can be allowed, IMS gateway system 501 continues the current session handling and transmits the INVITE message to a called party via CSCF 510. The current call status is set to Wait For Call Answer.

When the called party answers the call, the called party transmits a 200 OK message to CSCF 510. CSCF 510 transmits the 200 OK message to IMS gateway system 501. When IMS gateway system 501 receives the 200 OK message, IMS gateway system 501 requests the charging policy management and the charging rule is evaluated as the following:

```
IF   SIP_Method = "200" AND
Call_Status = "WAIT_FOR_CALL_ANSWER"
AND Trigger_Point_Type = "NOTIFY"
THEN
    Continue the current session.
    Sen "CCR [UPDATE]" charging report to OCS
    Start timer to wait for "CCA [UPDATE]" from OCS
END IF
```

Because the charging trigger type is "NOTIFY", IMS gateway system 501 will not interrupt the existing session. IMS gateway system 501 transmits the 200 OK message to CSCF 510 to let the session continue.

IMS gateway system 501 then transmits a Diameter CCR [UPDATE] message to report the charging record to OCS 520 to re-authorize session credit because the session answer time has been consumed at this point. OCS 520 re-reserves the credit from the current session answer time. OCS 520 transmits the CCA [UPDATE] message to IMS gateway system 501. The granted quota and expiry time is included in CCA AVP. The credit control trigger point is also populated in the extended AVP by OCS 520. After receiving the CCA message, IMS gateway system 501 dynamically provisions the charging filter criteria in a policy repository. IMS gateway system 501 starts a session control timer to real-time monitor the session based on the granted quota, and sets the call status to Answered. After receiving the 200 OK message, the calling party transmits a SIP ACK message that is forwarded to IMS gateway system 501 by CSCF 510. IMS gateway system 501 invokes the PEP to request the PDP to evaluate whether to transmit a charging report to OCS 520. In this example, the following charging filter rule is matched:

```
IF   SIP_Method = "ACK" AND Call_Status = "ANSWERED"
AND Trigger_Point_Type = "NULL"
THEN
    Continue the current session.
END IF
```

Because this message is not armed, IMS gateway system 501 lets the SIP message continue, and transmits the ACK message to the called party via CSCF 510. The call status is set to In Progress. After the granted quota is used up, IMS gateway system 501 transmits the used quota to OCS 520 via a CCR [UPDATE] message and requests to allocate the next new quota. OCS 520 determines whether the calling party has enough credit, allocates another new quota, and transmits the new quota via a CCA [UPDATE] message to IMS gateway system 501. IMS gateway system 501 resets the session control timer to the new quota to real-time monitor the session.

To initiate the end of the current session, the calling party transmits a BYE message that is received by IMS gateway system 501 via CSCF 510. IMS gateway system 501 invokes the PEP to request the PDP to get the following charging filter rule:

```
IF   SIP_Method = "BYE" AND Call_Status = "In_Progess"
AND Trigger_Point_Type = "NOTIFY"
THEN
    Continue the current session.
    Send "CCR [TERMINATION]" charging report to OCS
    Start timer to wait for "CCA [TERMINATION]" from OCS
END IF
```

IMS gateway system 501 allows the SIP message handling to continue and transmits the BYE message to CSCF 510. IMS gateway system 501 calculates the quota consumed until the time when the BYE message is received, stops the session control timer, and transmits a CCR [TERMINATION] message to OCS 520 to report the consumed quota. OCS 520 returns a CCA [TERMINATION] message to IMS gateway system 501 to indicate that the message has been received. The called party returns a 200 OK message to IMS gateway system 501 via CSCF 510 that indicates that the session resource of the called party is released. IMS gateway system 501 evaluates no rule to match this 200 OK message under the current session status, so no action is taken to control the session. IMS gateway system 501 then transmits a 200 OK message to release the calling party and release the session resource.

EXAMPLE #2

Figure 11:
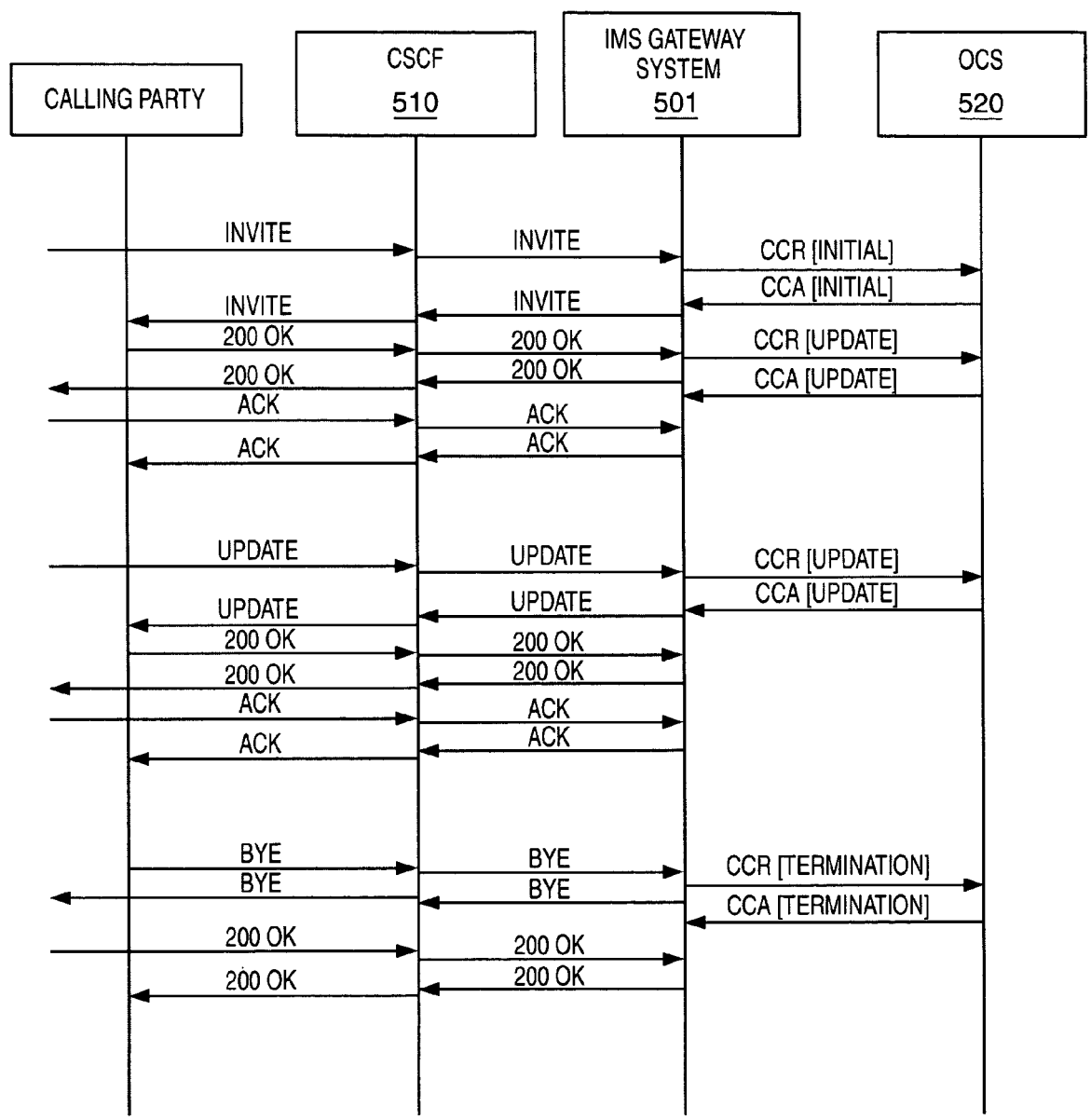
FIG. 11 is a message diagram illustrating a terminating IMS call scenario for an IMS network in an exemplary embodiment of the invention.

FIG. 11 illustrates a terminating IMS call scenario for IMS network 500 described in FIG. 5. To start, CSCF 510 of a called party receives a SIP INVITE message from the calling party. CSCF 510 transmits the INVITE message to IMS gateway system 501. IMS gateway system 501 evaluates that this is the first INVITE message of this session and the current call status is set to Null. IMS gateway system 501 then invokes the charging PEP to request the charging PDP for charging trigger processing. In the policy management, the charging trigger point is configured as an INTERRUPT. IMS gateway system 501 starts a timer to hold on the current session. The charging trigger rule in PDP can be expressed as the following:

```
IF   SIP_Method = "INVITE" AND Call_Status = "NULL"
AND Trigger_Point_Type = "INTERRUPT"
THEN
    Hold on the current session
    Send "CCR [INITIAL]" charging report to OCS
    Start timer to wait for the "CCA [INITIAL]" from OCS
END IF
```

IMS gateway system 501 then transmits a Diameter CCR [INITIAL] message to OCS 520 for credit authorization to roughly estimate the maximum session duration the called party can use. OCS 520 grants a quota and sets the granted quota to the relevant granted Quota AVP in Diameter Credit Control Answer (CCA) message. OCS 520 populates the extended session charging trigger AVP in CCA message. OCS 520 transmits the CCA [INITIAL] message to IMS gateway system 501.

When IMS gateway system 501 receives the CCA message and evaluates that the session can be allowed, IMS gateway system 501 continues the current session handling and forwards the INVITE request to the called party via the CSCF 510. IMS gateway system 501 then sets the current call status to Wait For Call Answer.

When the called party answers the call, the called party transmits a 200 OK message to CSCF 510. CSCF 510 forwards the 200 OK message to IMS gateway system 501. When IMS gateway system 501 receives the 200 OK message, IMS gateway system 501 requests the charging policy management and the charging rule is evaluated as the following:

```
IF   SIP_Method = "200" AND
Call_Status = "WAIT_FOR_CALL_ANSWER"
AND Trigger_Point_Type = "NOTIFY"
THEN
    Continue the current session.
    Send "CCR [UPDATE]" charging report to OCS
    Start timer to wait for "CCA [UPDATE]" from OCS
END IF
```

Because the charging trigger type is "NOTIFY", IMS gateway system 501 does not interrupt the existing session. IMS gateway system 501 transmits the 200 OK message to CSCF 510 to let the session continue. IMS gateway system 501 transmits Diameter. CCR [UPDATE] message to report the charging record to OCS 520 to re-authorize session credit because the session answer time has ended at this point. OCS 520 re-reserves the credit from the current session answer time.

OCS 520 transmits the CCA [UPDATE] message to IMS gateway system 501. The granted quota and expiry time is included in CCA AVP. The credit control trigger point is also populated in the extended AVP by OCS 520. When receiving the CCA message, IMS gateway system 501 dynamically provisions charging filter criteria in a policy repository. IMS gateway system 501 starts a session control timer to real-time monitor the session based on the granted quota. IMS gateway system 501 sets the call status to Answered.

When receiving the 200 OK message, the calling party transmits a SIP ACK message, which is forwarded to IMS gateway system 501 by CSCF 510. After IMS gateway system 501 receives the ACK message, IMS gateway system 501 invokes the PEP to request the PDP to evaluate whether to transmit a charging report to OCS 520. In this example, the following charging filter rule is matched:

```
IF   SIP_Method = "ACK" AND Call_Status = "ANSWERED"
AND Trigger_Point_Type = "NULL"
THEN
    Continue the current session.
END IF
```

Because this message is not armed, IMS gateway system 501 lets the SIP message continue, and transmits the ACK message to the called party via CSCF 510. IMS gateway system 501 sets the call status to In Progress. At this point, the media component of the calling party is updated, and the calling party transmits a SIP UPDATE message to CSCF 510. CSCF 510 transmits the UPDATE message to IMS gateway system 501. IMS gateway system 501 evaluates the UPDATE message of this session. IMS gateway system 501 invokes the charging PEP to request the charging PDP. The charging trigger point is evaluated as the following:

```
IF   SIP_Method = "UPDATE" AND Call_Status = "In_Progress"
AND Trigger_Point_Type = "INTERRUPT"
THEN
    Hold on the current session
    Send "CCR [UPDATE]" charging report to OCS
    Start timer to wait for "CCA [UPDATE]" from OCS
END IF
```

IMS gateway system 501 calculates the used quota for the existing media component, sets the sub-AVPs about the new media component charging parameter, and transmits the Diameter CCR message to report the charging record. Two MSCC AVPs are included in the CCR message. One MSCC AVP is used to report the used quota for the current media component, and debit credit from the subscriber balance in OCS 520. Another MSCC AVP is added to request credit for the new media component update from OCS 520.

When IMS gateway system 501 receives the CCA message, IMS gateway system 501 resets the session control timer to the new media component within the current session. IMS gateway system 501 transmits the UPDATE message to the called party via CSCF 510. For the ACK message under current session update status, IMS gateway system 501 doesn't have charging filter criteria. IMS gateway system 501 forwards the ACK message to the calling party message, and transmits the ACK message from the calling party to the called party.

When the called party ends the current session, the called party transmits a BYE message to IMS gateway system 501 via CSCF 510. IMS gateway system 501 invokes the charging PEP to request the charging PDP. The charging trigger point is evaluated as follows:

```
IF   SIP_Method = "BYE" AND Call_Status = "In_Progess"
AND Trigger_Point_Type = "NOTIFY"
THEN
    Continue the current session.
    Send "CCR [TERMINATION]" charging report to OCS
    Start timer to wait "CCA [TERMINATION]" from OCS
END IF
```

IMS gateway system 501 lets the SIP message handling continue, and transmits the BYE message to the calling party via CSCF 510. IMS gateway system 501 calculates the used quota until the time when the BYE message is received, and stops the session control timer. IMS gateway system 501 transmits a CCR [TERMINATION] message to OCS 520 to report the consumed quota. OCS 520 transmits a CCA [TERMINATION] message to IMS gateway system 501 to indicate the message has been received. The calling party returns a 200 OK message to indicate the session resource of the calling party is released. When IMS gateway system 501 evaluates that no rules match this message for charging report under the current session status, no action is taken to control the session. IMS gateway system 501 transmits a 200 OK message to release the session resource.

EXAMPLE #3

Figure 12:
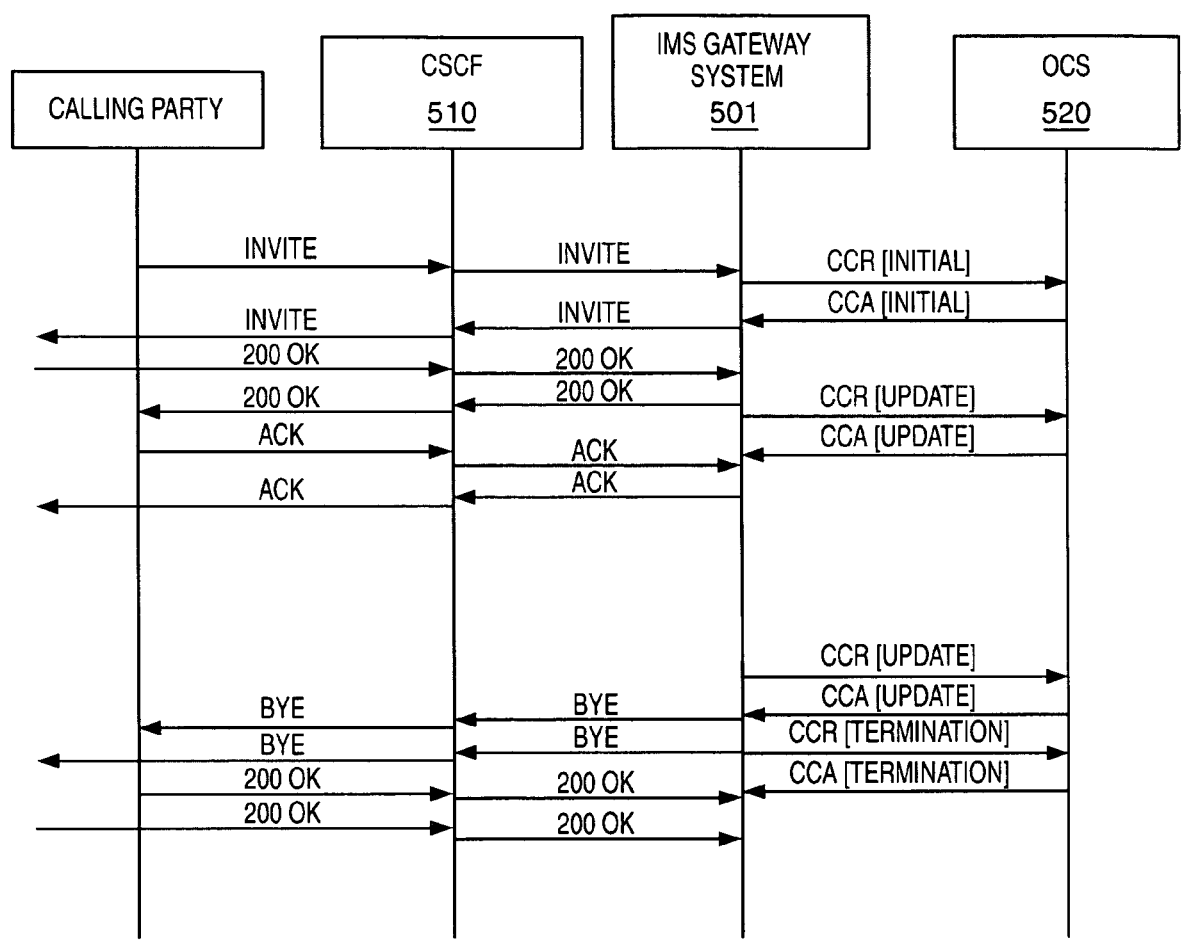
FIG. 12 is a message diagram illustrating a session termination after credit has been exhausted for an IMS network in an exemplary embodiment of the invention.

FIG. 12 illustrates a session termination after credit has been exhausted for IMS network 500 described in FIG. 5. To start, a calling party (or calling party station) transmits a SIP INVITE message to CSCF 510. CSCF 510 transmits the INVITE message to IMS gateway system 501. IMS gateway system 501 evaluates that this is the first INVITE message of this session, and the current call status is set to Null. IMS gateway system 501 invokes a charging Policy Enforcement Point (PEP) to request a charging Policy Decision Point (PDP) for charging trigger processing. In the policy management, the charging trigger point is configured as an INTERRUPT. IMS gateway system 501 starts a timer to hold on the current session. The charging trigger rule in the PDP can be expressed as the following:

```
IF   SIP_Method = "INVITE" AND Call_Status = "NULL"
AND Trigger_Point_Type = "INTERRUPT"
THEN
    Hold on the current session
    Send "CCR [INITIAL]" charging report to OCS
    Start timer to wait for the "CCA [INITIAL]" from OCS
END IF
```

IMS gateway system 501 transmits a Diameter Credit Control Request (CCR) [INITIAL] message to OCS 520 for credit authorization to roughly estimate the maximum session duration the calling party can use. OCS 520 grants quota units and sets the granted quota to the relevant granted Quota AVP in a Diameter Credit Control Answer (CCA) message. OCS 520 populates the extended session charging trigger AVP in the CCA message. OCS 520 then transmits the CCA [INITIAL] message to IMS gateway system 501. When IMS gateway system 501 receives the CCA message and determines whether the session can be allowed, IMS gateway system 501 continues the current session handling and transmits the INVITE message to a called party via CSCF 510. The current call status is set to Wait For Call Answer.

When the called party answers the call, the called party transmits a 200 OK message to CSCF 510. CSCF 510 transmits the 200 OK message to IMS gateway system 501. When IMS gateway system 501 receives the 200 OK message, IMS gateway system 501 requests the charging policy management and the charging rule is evaluated as the following:

```
IF   SIP_Method = "200" AND Call_Status =
"WAIT_FOR_CALL_ANSWER"
AND Trigger_Point_Type = "NOTIFY"
THEN
    Continue the current session.
    Send "CCR [UPDATE]" charging report to OCS
    Start timer to wait for "CCA [UPDATE]" from OCS
END IF
```

Because the charging trigger type is "NOTIFY", IMS gateway system 501 will not interrupt the existing session. IMS gateway system 501 transmits the 200 OK message to CSCF 510 to let the session continue.

IMS gateway system 501 then transmits a Diameter CCR [UPDATE] message to report the charging record to OCS 520 to re-authorize session credit because the session answer time has been consumed at this point. OCS 520 re-reserves the credit from the current session answer time. OCS 520 transmits the CCA [UPDATE] message to IMS gateway system 501. The granted quota and expiry time is included in CCA AVP. The credit control trigger point is also populated in the extended AVP by OCS 520. After receiving the CCA message, IMS gateway system 501 dynamically provisions the charging filter criteria in a policy repository. IMS gateway system 501 starts a session control timer to real-time monitor the session based on the granted quota, and sets the call status to Answered. After receiving the 200 OK message, the calling party transmits a SIP ACK message that is forwarded to IMS gateway system 501 by CSCF 510. IMS gateway system 501 invokes the PEP to request the PDP to evaluate whether to transmit a charging report to OCS 520. In this example, the following charging filter rule is matched:

```
IF  SIP_Method = "ACK" AND Call_Status = "ANSWERED"
AND Trigger_Point_Type = "NULL"
THEN
    Continue the current session.
END IF
```

Because this message is not armed, IMS gateway system 501 lets the SIP message continue, and transmits the ACK message to the called party via CSCF 510. The call status is set to In Progress.

After the granted quota is used up, IMS gateway system 501 transmits the used quota to OCS 520 via a CCR [UPDATE] message and requests to allocate the next new quota. OCS 520 determines that the calling party has exhausted the balance credit, and transmits a CCA [UPDATE] message to IMS gateway system 501 to indicate that no further quota can be allocated. IMS gateway system 501 transmits a BYE message to the calling party to disconnect the call leg of the calling party. IMS gateway system 501 also transmits a BYE message to the called party to disconnect the call leg of the called party. At the same time, IMS gateway system 501 transmits a CCR [TERMINATION] message to OCS 520 to end the current session charging. OCS 520 debits the usage credit of the new media component from the balance, and transmits a CCA [TERMINATION] message to IMS gateway system 501 to indicate that the session charging has successfully executed for the current session. The calling party transmits a 200 OK message to IMS gateway system 501 to indicate that the calling party is disconnected. The called party transmits a 200 OK message to IMS gateway system 501 to indicate that the called party is disconnected.

We claim:

1. An IP Multimedia Subsystem (IMS) gateway system for providing online charging in an IMS network, the IMS gateway system comprising:
   a first interface operable to communicate with a call session control function (CSCF) according to a first protocol;
   a second interface operable to communicate with an online charging server (OCS) according to a second protocol; and
   a charging trigger system coupled to the first interface and the second interface, the charging trigger system:
      receives a first message for a call session through the first interface from the CSCF wherein the first message is in the first protocol,
      processes the first message to determine whether to contact the OCS for online charging for the call session,
      generates a second message that comprises a charging request to transmit to the OCS responsive to a determination to contact the OCS,
      maps fields of the first message in the first protocol to fields in the second message in the second protocol,
      transmits the second message to the OCS through the second interface for online charging for the call session,
      receives a third message from the OCS responding to the second message,
      generates a fourth message indicating whether charging was allowed or denied; and
      transmits the fourth message to the CSCF through the first interface.

2. The IMS gateway system of claim 1 wherein the charging trigger system processes rule-based trigger points to determine whether to contact the OCS.

3. The IMS gateway system of claim 1 wherein the first interface comprises an IMS service control (ISC) interface and the second interface comprises an Ro interface.

4. The IMS gateway system of claim 3 wherein the first message comprises a Session Initiation Protocol (SIP) message and the second message comprises a Diameter Credit Control Application protocol (DCCA) message.

5. The IMS gateway system of claim 1 further comprising:
   a budget control system coupled to the charging trigger system and the second interface, the budget control system receives a message from the charging trigger system, generates an initial message that requests a quota amount of units from the OCS, transmits the initial message to the OCS through the second interface, receives a response message from the OCS indicating a quota amount of units for the call session, and monitors the amount of units consumed during the call session.

6. The IMS gateway system of claim 5 wherein if the quota amount of units is consumed during the call session or another message is received from the charging trigger system, then the budget control system:
   generates an interim message that indicates the number of units consumed and requests a new quota of units from the OCS, transmits the interim message to the OCS, receives a response message from the OCS indicating another quota amount of units for the call session, and monitors the amount of units consumed during the call session.

7. The IMS gateway system of claim 6 wherein if the budget control system receives a message from the charging trigger system indicating the end of the call session, then the budget control system:
   generates a final message that indicates the total amount of units used for the call session and transmits the final message to the OCS.

8. A method of operating an IP Multimedia Subsystem (IMS) gateway system for providing online charging in an IMS network, wherein the IMS gateway system comprises a first interface operable to communicate with a call session control function (CSCF) according to a first protocol, a second interface operable to communicate with an online charging server (OCS) according to a second protocol, and a charging trigger system coupled to the first interface and the second interface, the method comprising:
   receiving a first message for a call session in the charging trigger system through the first interface from the CSCF wherein the first message is in the first protocol,
   processing the first message to determine whether to contact the OCS for online charging for the call session,
   generating a second message that comprises a charging request to transmit to the OCS responsive to a determination to contact the OCS,
   mapping fields of the first message in the first protocol to fields in the second message in the second protocol,
   transmitting the second message to the OCS through the second interface for online charging for the call session;
   receiving a third message from the OCS in the charging trigger system responding to the second message;
   generating a fourth message indicating whether charging was allowed or denied; and
   transmitting the fourth message to the CSCF through the first interface.

9. The method of claim 8 wherein the step of processing the first message to determine whether to contact the OCS comprises:
   processing rule-based trigger points to determine whether to contact the OCS.

10. The method of claim 8 wherein the first interface comprises an IMS service control (ISC) interface and the second interface comprises an Ro interface.

11. The method of claim 10 wherein the first message comprises a Session Initiation Protocol (SIP) message and the second message comprises a Diameter Credit Control Application protocol (DCCA) message.

12. The method of claim 8 wherein the IMS gateway system further comprises a budget control system coupled to the charging trigger system and the second interface, the method further comprises:
   receiving a message from the charging trigger system in the budget control system;
   generating an initial message that requests a quota amount of units from the OCS;
   transmitting the initial message to the OCS through the second interface;
   receiving a response message from the OCS indicating a quota amount of units for the call session; and
   monitoring the amount of units consumed during the call session.

13. The method of claim 12 wherein if the quota amount of units is consumed during the call session or another message is received from the charging trigger system, then the method further comprises:
   generating an interim message in the budget control system that indicates the number of units consumed and requests a new quota of units from the OCS;
   transmitting the interim message to the OCS;
   receiving a response message from the OCS indicating another quota amount of units for the call session; and
   monitoring the amount of units consumed during the call session.

14. The method of claim 13 wherein if the budget control system receives a message from the charging trigger system indicating the end of the call session, then the method further comprises:
   generating a final message that indicates the total amount of units used for the call session; and
   transmitting the final message to the OCS.

15. An IP Multimedia Subsystem (IMS) gateway system for providing online charging in an IMS network, the IMS gateway system comprising:
   an IMS service control (ISC) interface operable to communicate with a call session control function (CSCF) according to ISC protocol;
   an Ro interface operable to communicate with an online charging server (OCS) according to Ro protocol; and
   a charging trigger system coupled to the Ro interface and the ISC interface, the charging trigger system:
      receives a first SIP message for a call session through the ISC interface from the CSCF wherein the first SIP message is in the ISC protocol,
      processes the first SIP message and rule-based trigger points to determine whether to contact the OCS for online charging for the call session,
      generates a first Diameter Credit Control Application protocol (DCCA) message responsive to a determination to contact the OCS,
      maps fields of the first SIP message to fields in the first DCCA message,
      transmits the first DCCA message to the OCS through the Ro interface for online charging for the call session,
      receives a second DCCA message from the OCS responding to the first DCCA message,
      generates a second SIP message indicating whether charging was allowed or denied; and
      transmits the second SIP message to the CSCF through the ISC interface.

16. The IMS gateway system of claim 15 wherein the charging trigger system transmits the first DCCA message to a session-based control function in the OCS through the Ro interface.

17. The IMS gateway system of claim 15 further comprising:
   a budget control system coupled to the charging trigger system and the Ro interface, the budget control system receives a message from the charging trigger system, generates an initial message that requests a quota amount of units from the OCS, transmits the initial message to the OCS through the Ro interface, receives a response message from the OCS indicating a quota amount of units for the call session, and monitors the amount of units consumed during the call session.

18. The IMS gateway system of claim 17 wherein:
   if the quota amount of units is consumed during the call session or another message is received from the charging trigger system, then the budget control system generates an interim message that indicates the number of units consumed and requests a new quota of units from the OCS, transmits the interim message to the OCS, receives a response message from the OCS indicating another quota amount of units for the call session, and monitors the amount of units consumed during the call session; and
   if the budget control system receives a message from the charging trigger system indicating the end of the call session, then the budget control system generates a final message that indicates the total amount of units used for the call session and transmits the final message to the OCS.

* * * * *

UNITED STATES PATENT AND TRADEMARK OFFICE
CERTIFICATE OF CORRECTION

PATENT NO.       : 7,599,478 B2                          Page 1 of 1
APPLICATION NO.  : 11/000176
DATED            : October 6, 2009
INVENTOR(S)      : Cai et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1345 days.

Signed and Sealed this

Twenty-eighth Day of September, 2010

David J. Kappos
*Director of the United States Patent and Trademark Office*